(12) United States Patent
Mäkelä et al.

(10) Patent No.: US 7,551,941 B2
(45) Date of Patent: *Jun. 23, 2009

(54) METHOD FOR SELECTING A BEARER SERVICE FOR A SERVICE IN A MOBILE TELECOMMUNICATIONS SYSTEM

(75) Inventors: Satu Mäkelä, Tampere (FI); Jouni Smolander, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/490,448

(22) Filed: Jul. 20, 2006

(65) Prior Publication Data

US 2006/0258353 A1 Nov. 16, 2006

Related U.S. Application Data

(62) Division of application No. 09/634,488, filed on Aug. 8, 2000, now Pat. No. 7,099,687.

(30) Foreign Application Priority Data

Aug. 9, 1999 (FI) .................................. 19991692

(51) Int. Cl.
*H04M 1/00* (2006.01)
*H04Q 7/20* (2006.01)
(52) U.S. Cl. ................. 455/552.1; 455/426.1; 370/230; 370/235
(58) Field of Classification Search ........... 455/552.1, 455/553.1, 426.1, 452.2; 370/230, 235, 236, 370/437
See application file for complete search history.

(56) References Cited

U.S. PATENT DOCUMENTS

| | | | |
|---|---|---|---|
| 5,638,412 A | 6/1997 | Blakeney, II et al. | 375/377 |
| 5,940,759 A | 8/1999 | Lopez-Torres et al. | |
| 6,032,188 A | 2/2000 | Mairs et al. | |
| 6,307,836 B1 | 10/2001 | Jones et al. | |
| 6,347,091 B1 | 2/2002 | Wallentin et al. | |
| 6,480,720 B1 | 11/2002 | Coan et al. | |
| 6,483,805 B1 | 11/2002 | Davies et al. | |

(Continued)

FOREIGN PATENT DOCUMENTS

CN 1129507 8/1996

(Continued)

OTHER PUBLICATIONS

PCT Written Opinion in International Application No. PCT/FI00/00661, dated Dec. 3, 2001.

(Continued)

*Primary Examiner*—Lee Nguyen
(74) *Attorney, Agent, or Firm*—Banner & Witcoff, Ltd.

(57) ABSTRACT

A method to select a bearer service for communication between a mobile terminal and a mobile network, where at least one bearer service is implemented in the mobile network, includes defining a set of requirements for the bearer service, obtaining information about selectable bearer services, comparing the set of requirements for the bearer service and the obtained information about selectable bearer services, and making a decision to accept or reject at least one of the selectable bearer services for communication based on the comparison.

36 Claims, 8 Drawing Sheets

U.S. PATENT DOCUMENTS

| | | | |
|---|---|---|---|
| 6,504,819 | B2 | 1/2003 | Fowler et al. |
| 6,647,265 | B1 | 11/2003 | Olofsson et al. ............ 455/445 |
| 6,668,175 | B1 | 12/2003 | Almgren et al. |
| 6,674,733 | B1 | 1/2004 | Huusko |
| 6,931,253 | B1 | 8/2005 | Hartikainen et al. |
| 7,120,115 | B1 | 10/2006 | Laaksonen |
| 7,123,630 | B1 | 10/2006 | Ueno |
| 2003/0039237 | A1 | 2/2003 | Forslow ...................... 370/352 |
| 2003/0211858 | A1 | 11/2003 | Coan et al. |
| 2005/0013272 | A1 | 1/2005 | Hwang et al. |

FOREIGN PATENT DOCUMENTS

| | | |
|---|---|---|
| CN | 1197581 | 10/1998 |
| EP | 0 848 650 A2 | 6/1998 |
| WO | WO 95/35002 | 12/1995 |
| WO | WO 97/12490 | 4/1997 |
| WO | WO 97/50263 | 12/1997 |
| WO | WO 9901991 A2 | 1/1999 |
| WO | 99/16264 | 4/1999 |
| WO | WO 99/16264 | 4/1999 |
| WO | 99/23842 | 5/1999 |
| WO | WO 99/23842 | 5/1999 |
| WO | WO 99/31907 | 6/1999 |
| WO | WO 99/41920 | 8/1999 |
| WO | WO 00/11885 | 3/2000 |
| WO | WO 00/41426 | 7/2000 |

OTHER PUBLICATIONS

PCT Written Opinion in International Application No. PCT/FI00/00661, dated Aug. 31, 2001.

Realizing the Information Future: The Internet and Beyond, Quality of Service: Options for the ODN Bearer Service, Best-Effort and Reserved Bandwidth Service, Jan. 6, 1999.

METHOD FOR SELECTING A BEARER SERVICE FOR A SERVICE IN A MOBILE TELECOMMUNICATIONS SYSTEM

This application is a divisional of U.S. application Ser. No. 09/634,488, filed 8 Aug. 2000 now U.S. Pat. No. 7,099,687, which is incorporated by reference in its entirety.

The invention applies generally to a method for selecting a bearer service for communication between a mobile terminal and a mobile network, in which method at least one bearer service is implemented in the mobile network. The invention also applies to a communication system which comprises at least a mobile terminal, a mobile network, at least one bearer service implemented in the mobile network, and means for selecting a bearer service for communication between said mobile terminal and said mobile network. The invention further applies to a mobile terminal for use in a communication system which comprises at least a mobile network, at least one bearer service implemented in the mobile network, and means for selecting a bearer service for communication between said mobile terminal and said mobile network.

The term "mobile communication system" refers generally to any communication system which enables a wireless communication connection between a mobile station (MS) and the fixed parts of the system when the user of the mobile station is moving within the service area of the system. A typical mobile communications system is the public land mobile network (PLMN). The majority of mobile communication systems in use at the time of filing this patent application belong to the second generation of such systems, a well-known example being the GSM system (Global System for Mobile Telecommunications). The invention applies advantageously to the next or third generation of mobile communication systems. The general packet radio service GPRS, a new service under development for the GSM mobile communication system and the 3rd generation Universal Mobile Telecommunications System, which is currently undergoing standardization, will be used as examples.

Figure 1A:
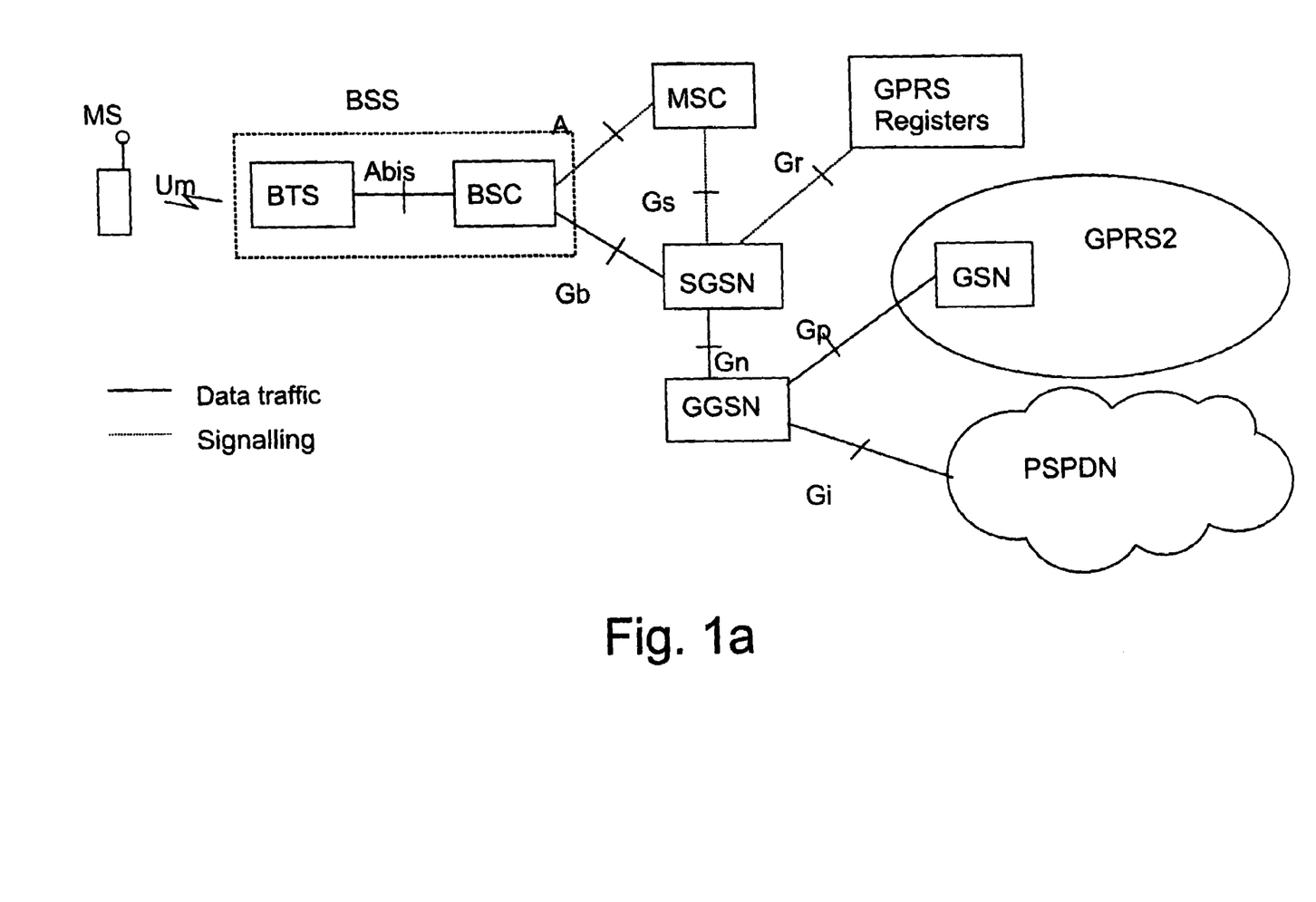
FIG. 1a shows a system in which the method according to a preferred embodiment of the invention can be applied.

The functional environment of the GPRS system comprises one or more subnetwork service areas, which are connected to form a GPRS backbone network (FIG. 1a). The subnetwork comprises numerous support nodes (SN), of which serving GPRS support nodes (SGSN) will be used as an example in this specification. The serving GPRS support nodes are connected to the mobile communication network (typically to a base station via an interface unit) in such a way that they can provide packet switching services for wireless communication devices via base stations (cells). The mobile communication network provides packet-switched data transmission between the support node and the wireless communication device. Different subnetworks may be, in turn, connected to external data networks, for example to a public switched data network (PSDN), via GPRS gateway support nodes (GGSN). Thus, the GPRS service enables packet-format data transmission between a wireless communication device and an external data network, wherein certain parts of the mobile communication network form an access network. Some examples of applications utilising packet-format data transmission are Internet telephony, video conferencing, file transfer and WWW browsing.

In third-generation systems, the concepts of a bearer service and a service are used. A bearer service is a type of telecommunication service that provides the capability for the transmission of signals between access points. A bearer service generally corresponds to the older concept of a traffic channel, defining for example the use of data rate and quality of service (QoS) that will be provided by the system for transferring information between a mobile station and some other part of the system. For example, a bearer service between the mobile station and a base station is a radio bearer service, and a bearer service between a radio network controller and a core network is e.g. an Iu bearer service (Interface UMTS bearer). In the UMTS system the interface between a radio network controller and a core network is called the Iu interface. In this context a service is provided by a mobile communication network in order to fulfil some task(s), e.g. data services carry out data transfer in the communication system, call services are associated with phone calls, multimedia, etc. Therefore a service necessitates information transfer between a mobile station and the fixed parts of the system, like a phone call or the transfer of a text message. A major task in the operation of a third-generation mobile telecommunications system is to manage (set up, maintain and terminate, as necessary) the bearer services so that each requested service can be provided to mobile stations without wasting the available bandwidth.

The quality of service level defines, for instance, how packet data units (PDU) are handled in the GPRS network during transmission. For example, the quality of service levels defined for the connection addresses are used to control the order of transmission, buffering (packet queues) and discarding of packets in support nodes and in gateway support nodes, especially when there are two or more connections which have packets to be transmitted simultaneously. Different quality of service levels define, for example, different delays for packet transmissions between different ends of the connection, as well as different bit rates. The number of discarded packet data units can also vary in connections having different quality of service levels.

For each connection, it is possible to request a different quality of service level. For example in e-mail connections, a relatively long delay can be allowed in the message transmission. However, interactive applications, such as video conferencing for example, require high-speed packet transmission. In some applications, as in file transfer, it is important that the packet transmission is error free, wherein packet data units are re-transmitted in error situations, if necessary.

It has been suggested that four different traffic classes be defined in the packet transmission service of the UMTS system, and as for the features of these traffic classes, the aim has been to take into account the different criteria for the different connection types. One criterion defined for the first and the second class is the real-time quality of the data transmission, wherein significant delays must not occur in the transmission. However, the accuracy of the data transmission is not such an important criterion. Correspondingly, for the third and fourth traffic classes, non-real-time data transmission is sufficient, but relatively accurate packet transmission is required. An example of real-time first-class data transmission is the transmission of speech signals in a situation where two or more people discuss with each other via wireless communication devices. An example of a situation where real-time second-class data transmission could be possible, is the transmission of a video signal for immediate viewing. Third-class, non-real-time packet communication can be utilised for example for the use of data-base services, such as browsing Internet home pages, in which data transmission with moderate speed and accuracy is a more important factor than real-time data transmission. In the fourth class of this example system, it is possible to categorise for instance the transfer of e-mail messages and files. It is obviously not necessary to have four said traffic classes, but the invention can be applied in packet transmission systems containing any number of traffic classes. Further, the present invention can also be applied in circuit switched systems. The properties of the four proposed traffic classes are summarized in table 1.

Some other applications may require as error-free communication as possible, but the bit rate of the communication

TABLE 1

| | First class: real-time, e.g. telephone conversation guaranteed capacity no acknowledgement | Second class (business class): real-time, e.g. video information guaranteed capacity acknowledgement possible buffering on application level | Third class (tourist class): interactive best effort method acknowledgement Internet browser, Telnet real-time control channel | Fourth class (cargo class): background transmission with best effort method acknowledgement background download of e-mail messages, calendar events, etc. |
|---|---|---|---|---|
| Class | | | | |
| Delay | 100 ms, 200 ms, 300 ms | <1 s | 2 s | Not defined |
| Bit error rate | $10^{-3}, 10^{-4}, 10^{-5}, 10^{-6}$ | $10^{-5}, 10^{-6}, 10^{-7}, 10^{-9}$ | $<10^{-9}$ | $<10^{-9}$ |
| Max bit rate | Defined | Defined | Not defined | Not defined |
| User priority | High, medium, low | High, medium, low | High, medium, low | High, medium, low |

Modern second and third generation mobile stations have much more efficient data processing properties than older mobile stations. There is already, for example, a possibility to make a connection to the Internet and to use a browser application in the mobile station to obtain information from the Internet, and in future it will be possible to establish multimedia calls with e.g. real-time video conferencing and the like. Therefore, such mobile stations will be designated as mobile terminals hence forward in this description. The term mobile terminal should also be understood to include so-called "radio cards" which comprise mobile telephone circuitry integrated into a circuit card. Such radio cards can be removably connected, for example via a PCMCIA interface, to data processing devices, such as portable or laptop computers, in order to provide mobile telephone functionality or data transfer capability via a radio communication network.

To allow the use of different applications in such a mobile terminal, there will be provided an execution environment for external applications, hereafter abbreviated as execution environment in this description. Such external applications are not necessarily provided only by the manufacturer of the mobile terminal but some third party manufacturers may also provide such applications. To assure compatibility between mobile terminals and external applications, the mobile application execution environment (MExE) standard is under development. The present invention is not restricted to the mobile application execution environment standard but it can also be applied with other suitable execution environments for mobile terminals.

The user of a mobile terminal can have access to many kinds of service via a mobile telecommunication network using the mobile terminal. There is an enormous number of service providers connected to e.g. the Internet network. They provide many kinds of services, such as database services, other information searching services, telephone applications, video applications, networked games etc. The user initiates a service request by starting a desired application using the terminal user interface. In the mobile terminal, the execution environment is activated by the service request and also the requested application is activated. The terminal makes a connection via the mobile network to the Internet network or some other network where the desired service exists.

The requirements of different applications may differ significantly. Some applications require fast communication between sender and receiver. Such applications are, for example, video and telephone applications.

connection is less important. Such applications include e-mail and database applications. Therefore, there is a problem in using these kinds of applications in mobile terminals, namely how to select the optimum bearer service for a particular communication task. In future mobile networks, it is likely that the service requirements of users will differ greatly, depending on the capabilities of the terminals they use, the applications they want to run, the capabilities of networks and the kind of user subscription they have.

In present systems, some applications contain information on what kind of bearer services they need. The bearer selection can be based on the destination server, which can be e.g. a so-called World Wide Web server (WWW) communicating with the Internet network. The selection of a bearer service is driven by the network address of the server being contacted and the network protocol being used.

Many mobile terminals communicate with networks using more than one bearer service. The network operator and/or user may wish to program the mobile terminal to use a specific bearer service in order to optimise a particular function, for example network loading, response times, etc.

At the present time the choice of a bearer service is typically driven by the application being used. The user or network operator may categorise applications by their use of bearer services.

These previously known systems all involve some inherent disadvantages. For example, some applications can be executed in different kinds of terminal where the properties of the terminal affect the demands on the bearer services of the applications being executed. Also, the user may have his/her own demands and preferences which are not taken into account in present systems. Furthermore, there may also be some situations in which the mobile network may not be able to provide all bearer services, for example when the network is overloaded.

In present systems, the mobile terminal and the mobile network negotiate the bearer service. If the network cannot provide the requested bearer service, probably the quality of service provided for the communication is not appropriate. Let us assume that there exists a video application where the resolution of the video is quite high, e.g. 800×640 pixels. If the user wishes to execute this video application with a mobile terminal which has means to connect via a high-speed circuit-switched data connection (HSCSD bearer service) and the mobile terminal is locally connected to a laptop PC which has a display with a resolution of at least the mentioned 800×640, the application may be executed with its default resolution. If the user only has a mobile terminal which comprises a lower resolution display, for example 640×480, the application will still try to request a bearer service for the maximum resolution (800×640), although a bearer service for smaller resolution (640×480) would be adequate.

There are also other criteria which affect the requirements of the bearer service needed. In another example, a mobile terminal can be used as a remote terminal for a server. The mobile terminal and the server need to exchange some data. The type of server for which the mobile terminal is used as a remote terminal may vary and so may the properties of the server. For example, the communication speed may differ. Therefore there can be different criteria for the selection of bearer service depending on properties of the server in question.

It is also possible that two mobile terminals are communicating with each other and must select bearer services. The selection of an appropriate bearer service depends inter alia on the properties of both mobile terminals and the properties of the mobile networks with which the mobile terminals are communicating.

The user may also visit the area of a mobile network other than his/her home mobile network. In the visited mobile network the bearer services that may be selected may vary from those of the home mobile network. The pricing policy may also differ.

It is thus an object of this invention to provide a method and a system for selecting a bearer service for an application in a mobile telecommunications system so that the selected bearer service advantageously has the optimum features to fulfil the demands for the application being run, as well as the user's demands, to cater for the properties of the mobile terminal and the properties and criteria set by the mobile network.

The objects of the invention are fulfilled by taking into account the requirements of the application, the user, the terminal being used, and the network. A method according to a first embodiment of the present invention is characterized by what is disclosed in the characterising part of the appended claim 1. A method according to a second embodiment of the present invention is characterized by what is disclosed in the characterising part of the appended claim 21. A method according to a third embodiment of the present invention is characterized by what is disclosed in the characterising part of the appended claim 25. A communication system according to the present invention is characterized by what is disclosed in the characterising part of the appended claim 26. A mobile terminal according to the present invention is characterized by what is disclosed in the characterising part of the appended claim 42. A bearer service selection application interface according to the present invention is characterized by what is disclosed in the characterising part of the appended claim 48. A network element according to a first embodiment of the present invention is characterized by what is disclosed in the characterising part of the appended claim 49. A network element according a second embodiment of the present invention is characterized by what is disclosed in the characterising part of the appended claim 50.

The present invention provides significant advantages over prior art systems and methods. By using the method according to the invention, an optimum bearer service can be selected, wherein the network loading can be optimised, network services can be provided to as many users as possible, and also the execution of the application is best suited for the respective demands of the user and the properties of the mobile terminal being used.

The invention will now be described in more detail in the following with reference to the appended figures, in which.

In the following description of a preferred embodiment of the invention, a UMTS type mobile communication system will be used as an example; however, it will be apparent to someone of ordinary skill in the art that the invention is not restricted solely to this system but can also be applied to other communication systems which may have different bearer services available for communication.

Figure 1B:
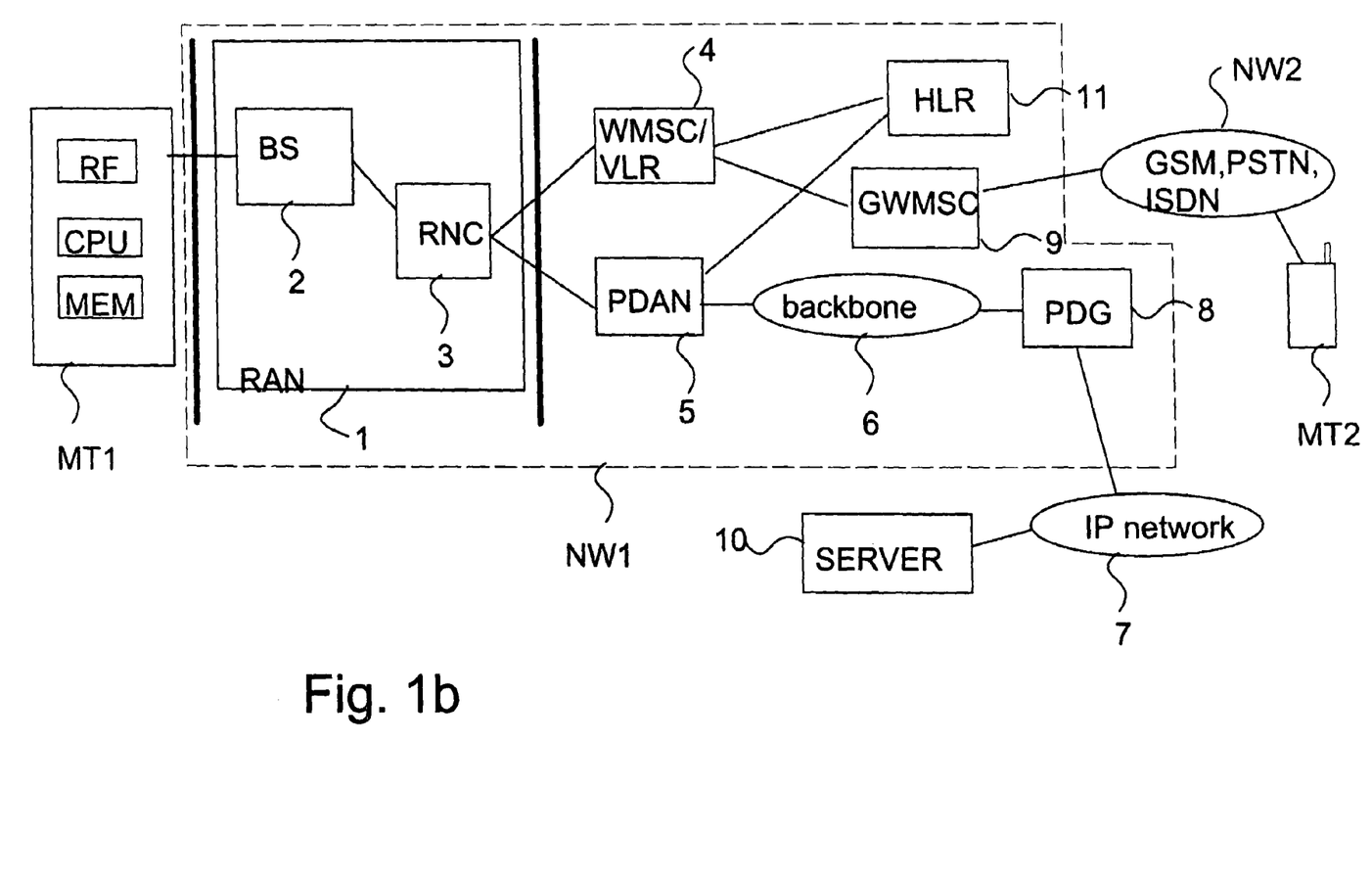
FIG. 1b shows another system in which the method according to a preferred embodiment of the invention can be applied.
Figure 2A:
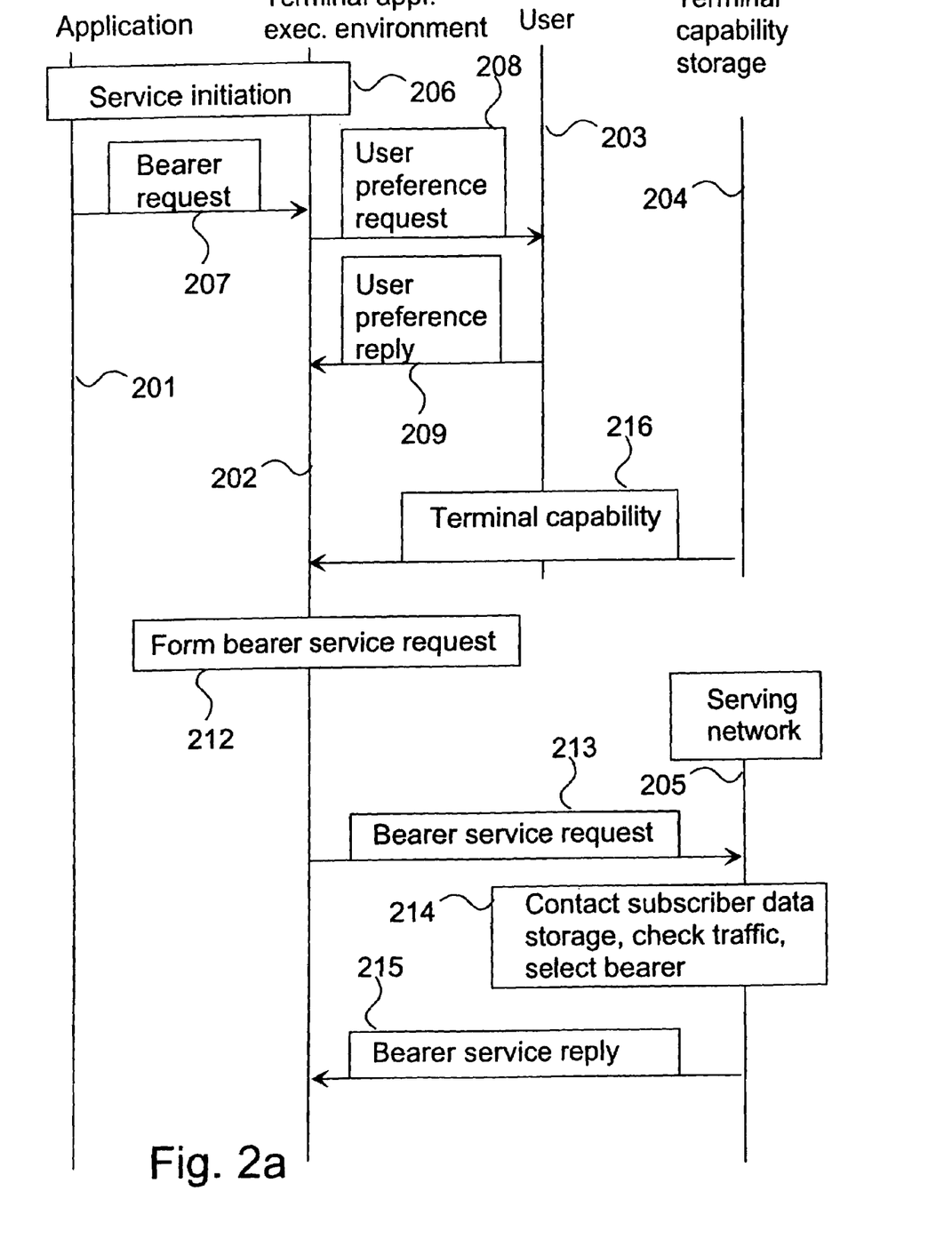
FIG. 2a shows a diagram describing the method according to a preferred embodiment of the invention.
Figure 2B:
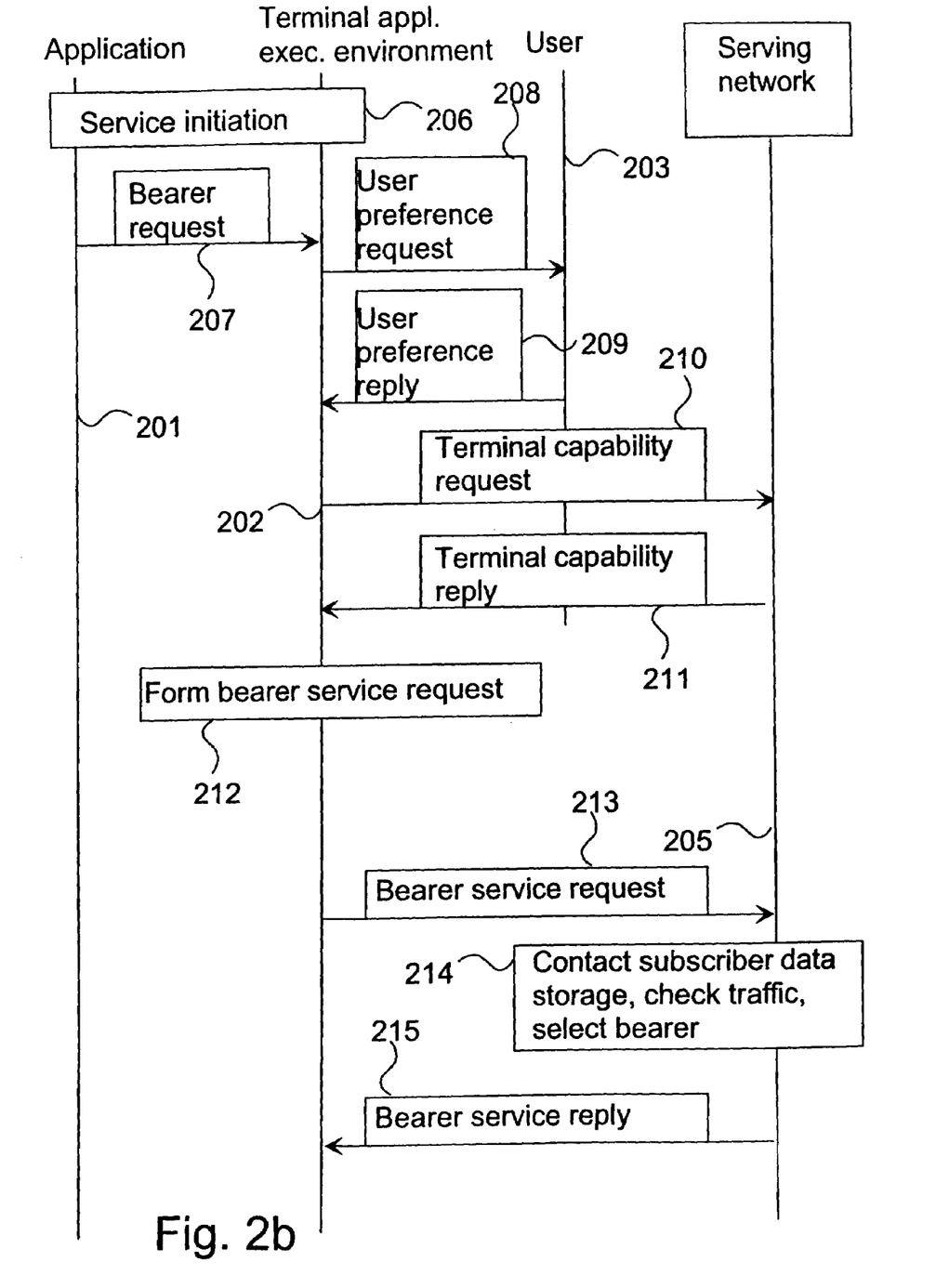
FIG. 2b shows a diagram describing the method according to another advantageous embodiment of the invention.

The operation of the invention will be described in relation to FIGS. 1b, 2a and 2b. FIG. 1b shows part of a UMTS system comprising a mobile terminal MT1, a radio access node 1 (RAN) consisting of a base station 2 (BS), and a radio network controller 3 (RNC) controlling the base station 2 and routing the connections between the base station 2 and the rest of the system, a wireless mobile switching centre 4 (WMSC) and a packet data access node 5 (PDAN) as alternative routing possibilities in addition to the radio network controller 3.

The mobile terminal MT1 comprises inter alia a processor CPU, memory means MEM, subscriber identity module (SIM) or respective means which are used for subscriber identification, and a radio part RF for communication with base station 2. The processor CPU can be included for example in an application specific integrated circuit (ASIC, not shown), which can be used to carry out a great amount of the logical functions of the mobile terminal MT1. It is also possible that there is more than one processor CPU in the mobile terminal, but in the following it is assumed that there is only one processor CPU for program execution. The memory means contain advantageously random access memory (RAM), read only memory (ROM), and at least part of the memory of the SIM. The mobile terminal MT1 also comprises a user interface, such as a keypad, a display device and audio means, e.g. a microphone and a loudspeaker, but these are not shown in FIG. 1b.

In FIG. 1b, it has been assumed that call management (CM) functions are implemented in the mobile terminal MT1 and both in the WMSC 4 and the PDAN 5. These call management functions provide means for originating a call, maintaining a call and terminating a call. Therefore the mobile terminal MT1 and the WMSC 4 or the PDAN 5 exchange call signalling messages to originate, maintain and terminate a call. The bearer management (BM) and the radio resource management (RM) functions are implemented in the mobile terminal MT1 and in the radio network controller 3. The bearer management functions are e.g. used for selecting one or more logical channels for communication between the mobile terminal MT1 and the base station 2, according to the properties of the selected bearer service. The radio resource management functions are e.g. used for selecting a radio channel for the radio path between the mobile terminal MT1 and the base station BS 2.

A packet data connection between the mobile terminal MT1 and IP network 7 can be established from the packet data access node 5 (PDAN) via a packet data backbone 6 and a packet data gateway 8 (PDG). It is possible to create a circuit-switched data connection between the mobile terminal MT1 and the mobile network via the radio access node 1, the wireless mobile switching centre 4 and a gateway wireless mobile switching centre 9 (GWMSC). This gateway wireless mobile switching centre 9 has means for forming a connection between the mobile network and another network NW2, such as GSM, PSTN or ISDN.

Figure 4:
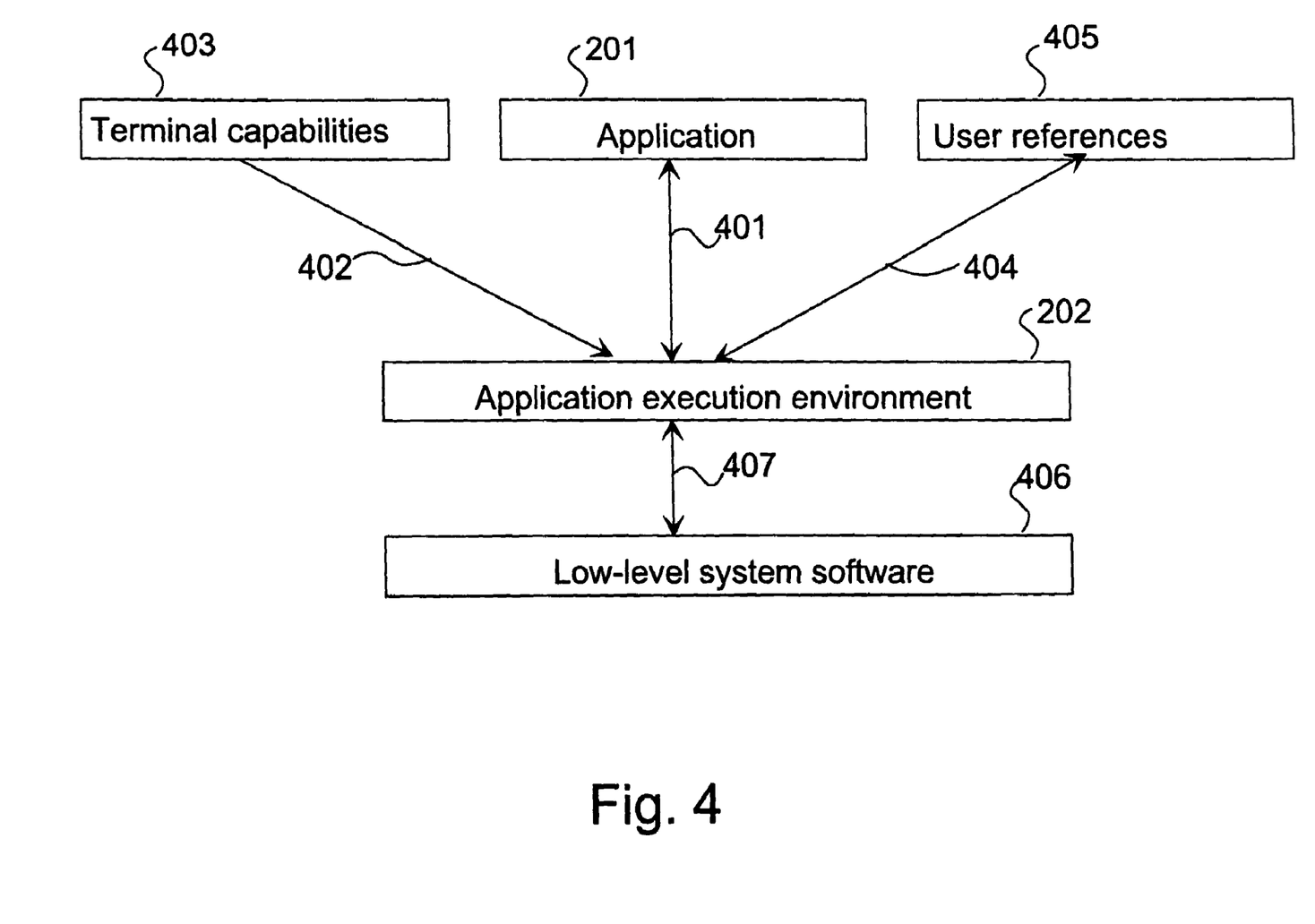
FIG. 4 shows a block diagram describing an application programming interface relating to bearer selection.

In the following a method according to an advantageous embodiment of the present invention will be described with reference to the diagrams of FIGS. 2a, 2b and FIG. 4. In the FIGS. 2a and 2b the vertical lines describe functional elements in a method according to an advantageous embodiment. Line 201 represents the application, line 202 the execution environment, line 203 the user, line 204 the mobile terminal capability storage and line 205 represents the serving network.

First, the user of the mobile terminal MT1 starts an application in the mobile terminal MT1 e.g. using the user interface of the mobile terminal MT1. Possibly the application could be started remotely. The application is e.g. a networked game. The program code of this application may have been loaded earlier e.g. from a server 10 connected to the IP network and saved into the memory means MEM of the mobile terminal. In the mobile terminal MT1, there is provided an execution environment 202. It is activated by the service request from the user via the application (block 206). The role of the execution environment 202 in the terminal is to collect all the requirements relating to the desired bearer service. The requirements are gathered from the requested application in the terminal, from the terminal (i.e. terminal capability storage 204), from the user and from the network. The execution of the execution environment 202 and the requested application are controlled by the processor CPU of the mobile terminal.

The application started by the user provides its service requirements to the execution environment 202 (block 207). These application service requirements can be e.g. quality of service parameters, such as information about the acceptable delay, bit rate, bit error rate etc, and traffic class, such as UMTS bearer traffic class. The application's service requirements may also include estimated capacity requirements, that is the number of bits to be transferred. The application service requirements in different embodiments can vary from those mentioned above. The application may be capable of indicating the bearer traffic class directly, or it may indicate some preferred quality of service parameters in a consistent manner.

The logical interface between applications 201 and the execution environment 202 is called a bearer service selection application programming interface BSSAPI. It is represented by an arrow 401 in FIG. 4. There are also other means to get information about terminal capabilities and user preferences from the terminal capabilities definition block 403 and the user preferences definition block 405. One other API 402 is arranged between the terminal capabilities definition block 403 and the execution environment 202. Another API 404 is arranged between the user preferences definition block 405 and the execution environment 202. The execution environment 202 communicates with the low-level system software 406 of the mobile terminal MT1 via a low-level system API 407.

Advantageously more than one application can be run simultaneously in the mobile terminal MT1. A single application may also have more than one connection to the network simultaneously. There is a separate bearer service request process for all separate applications/connections. Therefore each bearer service will be given an identifier in the response from the system.

Referring once more to FIGS. 2a and 2b, the execution environment 202 may also ask the user for preferences relating to the desired bearer (block 208). Selection of preferences may also be made without user interaction using predefined rules. The execution environment 202 may further request authorisation for automatic service initiation of an alternative bearer, e.g. a more expensive choice. The user may be willing to automatically accept e.g. a more expensive alternative bearer in order to obtain the desired service. The user may reply to such a request e.g. using the user interface of mobile terminal MT1. The reply is transferred to the execution environment 202 (block 209). At this stage any other user preferences are also taken into account. For example, the subscriber data in the network, e.g. in the home location register 11 (HLR) also contains information about allowed services and preferences (user profiles). The subscriber data may be defined by the network operator and it relates to the user's subscription options.

In another phase the execution environment 202 also gathers information about those capabilities of the mobile terminal MT1 which affect the bearer selection. This information is e.g. the amount of accessible memory, display properties, such as resolution, modem properties, and terminal class. It is also important to know if the mobile terminal MT1 has means for packet switched communication and/or means for circuit-switched communication. In some circumstances the version, manufacturer and model information may be gathered. At least part of this terminal information is stored advantageously in the memory means MEM, for example in ROM or in the SIM. This terminal information is read from the memory means MEM (block 216).

Some information about the terminal may also be stored in the network and can be found based on e.g. the mobile terminal's International Mobile Equipment Identification IMEI-identifier. To gather terminal capability information from the network, the execution environment 202 creates a terminal capability request network message (block 210 in FIG. 2b), which is sent to the mobile network and processed there. In the network the request is handled for example by the wireless mobile services switching centre WMSC 4 and the information is collected. Then a reply network message is formed which includes the requested information and this reply network message is sent to the mobile terminal MT1 (block 211).

The execution environment 202 processes the information gathered (e.g. from the application, the mobile terminal MT1, the user and/or network) and based on that information creates a bearer service request network message (block 212). In the processing phase, the execution environment 202 analyses and prioritises the information in order to find the most critical demands. The execution environment 202 also has the ability to deal with and resolve contradictory requirements and to form an appropriate bearer service request. In the case of contradictory requirements the user can be asked for input. For example, the application may ask for a communication rate of 14400 bit/s, but the modem of the terminal can handle only 9600 bit/s at maximum. In this case the execution environment 202 will advantageously select 9600 bit/s unless the user preferences or user reply prohibit that. The user may e.g. have restricted the communication rate so that it must be over 10000 bit/s. The way in which the execution environment 202 will build up the bearer service request network message depends inter alia on the practical implementations but it should be consistent within all mobile terminals communicating with a certain mobile network/telecommunications system.

Figure 3A:
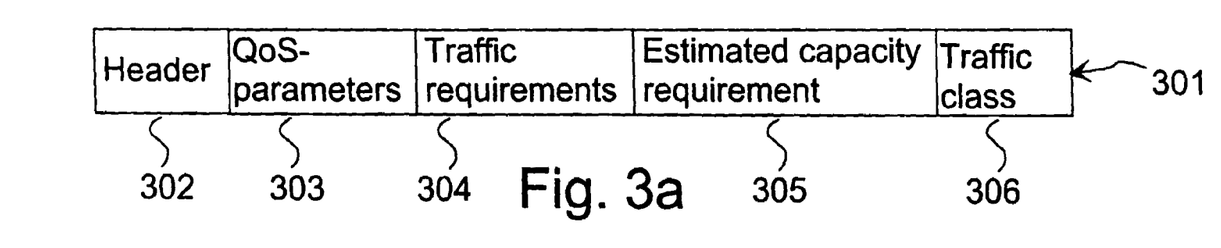
FIGS. 3a-3d show examples of advantageous packet formats used in the method according to a preferred embodiment of the invention.

FIG. 3a presents an advantageous example of the packet format of the bearer service request message 301 by which the application service requirements can be forwarded to the execution environment 202. First, there is a header field 302, which in this example format indicates the beginning of the packet. The value and the length of the header field 302 can vary, but advantageously the header field 302 is standardised so that applications can be run in different mobile terminals MT1.

The header field 302 is followed by parameter fields. These parameter fields can be either variable or fixed length and can include sub-fields. If an application does not have values for all fields and sub-fields, missing parameters are advantageously coded as zeros. It is apparent that the detailed structure of the packet format, i.e. the number of the parameter fields and the number of the sub-fields are used as non-restrictive examples.

In this example the first parameter field 303 is used for QoS information. Advantageously it has a delay sub-field, a bit error rate sub-field and a bit rate sub-field. The second parameter field 304 carries traffic requirement information. The third field 305 is reserved for estimated capacity requirement information. The fourth parameter field 306 is for traffic class information.

It is also possible that the application provides more than one alternative for some or all of the mentioned bearer service parameters. For example, there may be two bit rate-sub-fields in the packet which the application forwards via the BSSAPI to the execution environment 202.

Methods similar to those presented above can advantageously be applied to collect the terminal information from the terminal capabilities definition block 403 to the execution environment 202 and the user information from the user preferences definition block 405 to the execution environment 202. However, the detailed structure of the packets to communicate the information may vary. The execution environment 202 will store the parameters in memory means MEM until all parameters relating to bearer service selection are collected.

Once a bearer service request network message has been formed, the mobile terminal MT1 advantageously sends a message to the mobile network under which the mobile terminal is in operation (block 213). The area covered by the switching centre that controls the communication between the mobile terminal and the mobile network is called the serving mobile network. The serving mobile network may be the home network of the mobile terminal in question, or some other mobile network (visited mobile network), as is known to a person skilled in the art. The transmission is carried out through the radio path, between the mobile terminal MT1 and at least one base station of the serving mobile network. The bearer service request network message is further communicated to the wireless mobile switching centre 4 of the serving mobile network.

The wireless mobile switching centres 4 of the mobile network comprise a database for maintaining information about those mobile terminals which are in operation in the wireless mobile switching centre area. In GSM- and UMTS-systems, that database is called the Visitor Location Register (VLR). The mobile network also comprises a database called the Home Location Register 11 (HLR) where the user's subscription information is stored, including the telephone number, the IMEI of the mobile terminal, etc.

That wireless mobile switching centre 4 which receives the bearer service request network message, examines the content of the message. The wireless mobile switching centre 4 also contacts the home network of the mobile terminal MT1 to examine the user's subscription information (block 214). The user's subscription information may have some restrictions that may affect the selection of the bearer service. There may be e.g. different kinds of mobile subscriptions with different pricing policies. Therefore it is possible that the bearer service request has to be denied completely, or the allowable bearer services for the particular user may limit the selection of the bearer service. The result of examination of the user's subscription information is sent back to the wireless mobile switching centre 4 of the serving mobile network.

Based on the reply from the home network, the wireless mobile switching centre 4 denies the bearer request or continues the bearer service selection process. In the latter case, or in such a case that the user's subscription information does not affect the selection, the other grounds for the bearer service requested are examined in the serving mobile network, advantageously taking into account the traffic situation and remote network conditions. In this phase the properties of the serving mobile network are compared with the parameters in the request and a suitable bearer service is suggested. The bearer selection may also be affected by the traffic situation of the serving mobile network. If the serving mobile network cannot support the requested bearer service at the time, the request may be denied or another bearer service than requested is suggested. The serving mobile network offers the best possible service, taking into account the mobile terminal, the application and network capabilities, the user preferences, as well as the user's subscription options.

On the basis of the result of the bearer selection process the serving mobile network forms a bearer service reply network message, and sends it to the mobile terminal MT1 that initiated the bearer service selection request (block 215). In the mobile terminal MT1 the execution environment 202 handles this information. At this stage the execution environment 202 does not necessarily accept the suggested bearer service. It may form a message to be shown on the display of the mobile terminal to inform the user about the suggested bearer service, or possibly a list of bearer services that may be selected. In this context it is also preferable to inform the user of the price of the suggested bearer service. The user can now accept or reject the selection. In another alternative, the execution environment 202 accepts the suggested bearer service automatically and possibly informs the user of the selection.

Figure 3B:
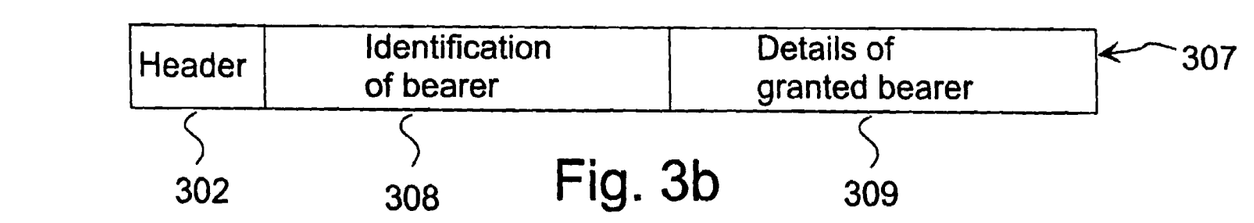

FIG. 3b presents an advantageous example of the response packet format of the bearer service reply message 307. This message is used by the execution environment 202 to inform the application of the bearer that was granted for it through the BSSAPI 401. The packet contains a header field 302 and other fields, for example the identification of bearer field 308 and a details field 309 which contains details of the granted bearer service, e.g. delay, bit rate, bit error rate, traffic class, etc.

In the bearer service selection process the selected bearer service is next activated in the serving mobile network in question and the execution of the application can be started. But, if the bearer selection request is denied for some reason, the application is advantageously stopped.

It is possible that there will be a need to change the bearer service for some reason during communication. For example, the traffic situation in the mobile network can vary and may necessitate changes to some bearer services. The mobile terminal MT1 may also move farther from the base station which may decrease the quality of the radio signal.

Figure 2C:
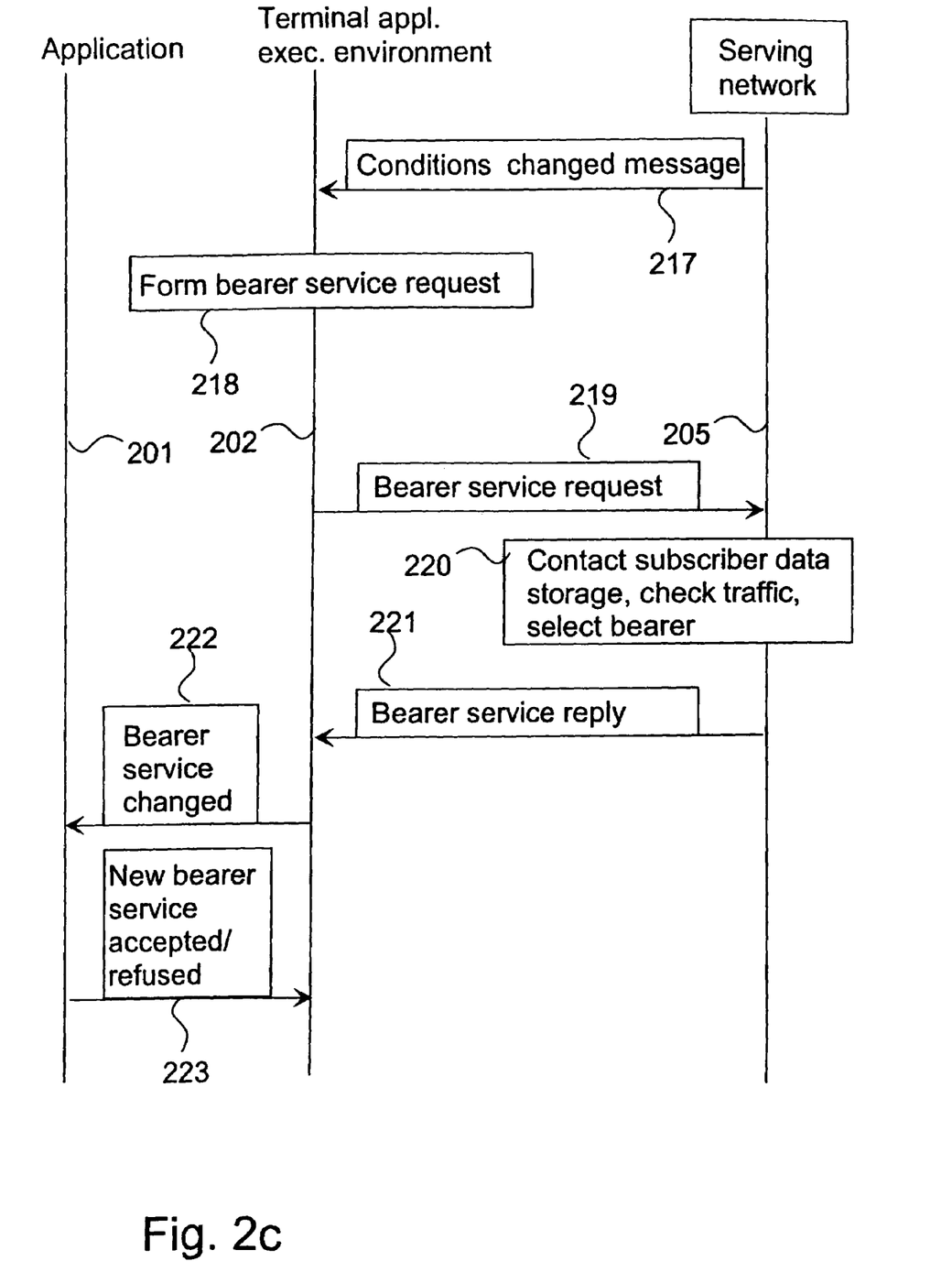
FIG. 2c shows a diagram describing a method of bearer service renegotiation according to an advantageous embodiment of the invention.
Figure 3C:
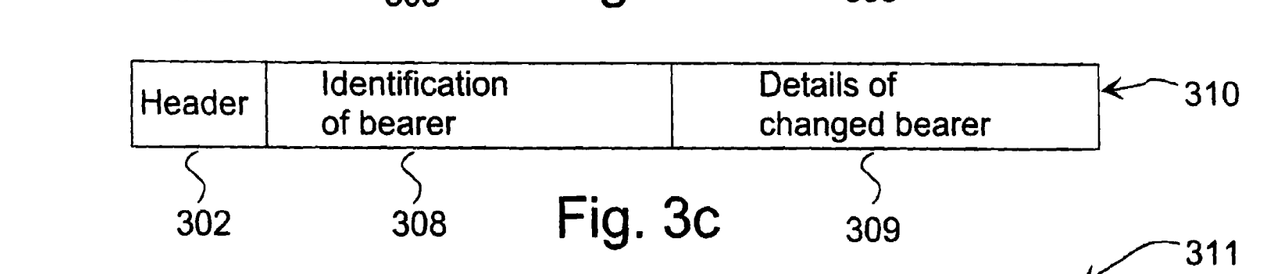

Therefore e.g. a reduction in bit rate may be needed. In this situation the network informs the mobile terminal MT1 of the changed conditions by sending e.g. a conditions changed network message (block 217 in FIG. 2c). The execution environment 202 forms a renegotiation request network message (block 218) and sends it to the serving mobile network (block 219). In the serving network the renegotiation request network message is examined and a bearer service is reselected, if possible (block 220). Finally, to complete the renegotiation of the bearer service process, the serving mobile network forms a bearer service reply network message on the basis of the result of the bearer reselection process, and sends it to the mobile terminal MT1 that initiated the bearer service selection request (block 221). In the mobile terminal MT1 the execution environment 202 transfers a bearer service change message 310 via the BSSAPI 401 to the application which this change concerns (block 222). One advantageous example of a packet format for the bearer service change message 310 is presented in FIG. 3c. The packet contains a header field 302, an identity field 308 and a details field 309. The identity field 308 is used to identify the bearer service in question. The details field 309 contains information about the changed parameters, e.g. new delay, new bit rate, etc. The application 201 informs (block 223) the execution environment 202 that the suggested change of the bearer service is either accepted or rejected.

It should be noted here that the network messages exchanged between the mobile network NW1 and the mobile terminal MT1 are not necessarily the same messages as the messages 301, 307, 310, 311 communicated in the mobile terminal MT1, between the execution environment 202 and the application 201, the terminal capabilities definition block 403 and the user preferences definition block 405, and the application execution environment.

In the above situation the bearer service can be renegotiated with the mobile terminal MT1 and the mobile network. In this renegotiation process the bearer service selection procedure is very similar to the bearer service request procedure presented earlier. The main difference is that the identifier of the bearer service to be changed has to be informed to the mobile network.

The need for renegotiation of bearer services can also be due to a situation, in which the user of the mobile terminal MT1 moves to another operator's mobile network, i.e. roaming. There may be limitations on the bearer services available. If such limitations take place and the previous bearer service or services cannot be maintained in the new mobile network, the mobile network should indicate this situation to the mobile terminal MT1 by using e.g. the conditions changed network message 217. The mobile terminal MT1 may then either accept a new bearer service, and perhaps later try to renegotiate to get a better bearer service, or stop the service execution.

It is also possible that the available bearer services in the new mobile network are even better than in the previous mobile network. In some situations the network may have means for informing the mobile terminal of the better bearer service parameters by using e.g. the conditions changed network message.

This above mentioned mechanism can also be used in a situation where the user of the mobile terminal MT1 moves within the same operator's mobile network, but to a sub-area, which has different bearer services available.

There may also be some other situations in which the bearer service is renegotiated. For example, the application may need a faster bit rate or a reduced delay. The application 201 forms a renegotiation request message 311. If the bearer service renegotiation process is initiated by an application 201 running in the mobile terminal MT1, or the user of the mobile terminal MT1, the execution environment 202 forms a renegotiation request network message, which is sent to the mobile network NW1. The execution environment 202 may also check the user preferences and terminal capabilities in this context, or the execution environment may use that information, which was saved in the mobile terminal MT1 when the bearer service was negotiated at the beginning of the communication.

Figure 3D:
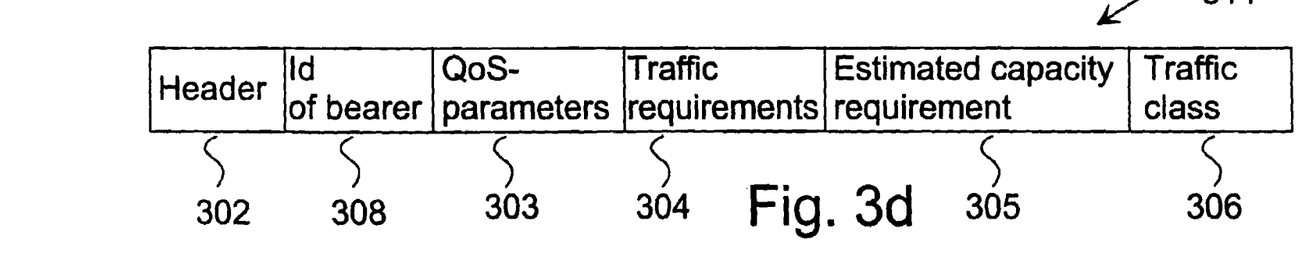

One advantageous example of a packet format for the renegotiation request message 311 is presented in FIG. 3d. In addition to the parameter fields 303-306 the request message 311 contains an identity field 308, in which the application 201 indicates to the execution environment 202 the identifier of the bearer service to be changed. This identifier of the bearer service does not have to be the same as the identifier which the mobile network has given to the bearer service in question.

The mobile network examines the request and performs all necessary checks, as was described earlier in the description of the present invention (e.g. the network checks user subscription information if not already known, checks the mobile network's own traffic situation and capabilities and also optionally consults the destination network). Based on those checks, the mobile network either accepts or rejects the renegotiation request and informs the mobile terminal MT1 of the decision.

In the mobile terminal MT1 the execution environment 202 receives the network reply and informs the result to the application by using e.g. the bearer service change message 310. The application 201 may then either accept or refuse the renegotiated bearer service.

It is apparent to a person skilled in the art that the above mentioned phases which are carried out in the mobile terminal MT1, can be implemented as processes or programs of the processor CPU of the mobile terminal MT1. In a similar way the phases which are carried out in the wireless mobile switching centre 4, can be implemented as processes or programs of some processing means (not shown) of the wireless mobile switching centre 4.

It is also possible that the selection of a suitable bearer service is performed in the mobile terminal MT1, wherein the mobile terminal MT1 requests information of available bearer services from the network. When the mobile terminal MT1 has gathered all the necessary information for selection of the bearer service, the mobile terminal performs the selection and begins a process for activating the selected bearer service in the serving mobile network.

Figure 2D:
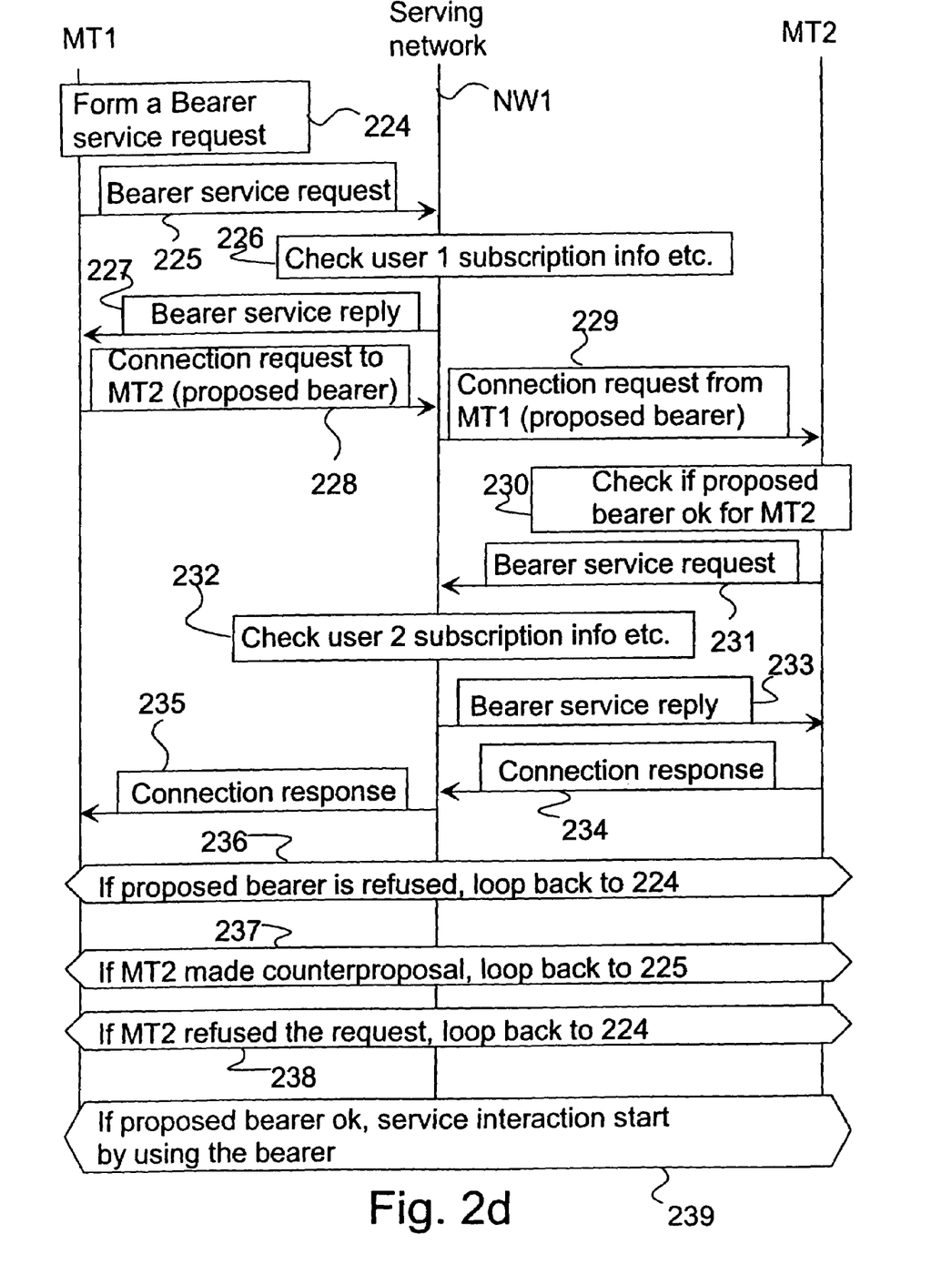
FIG. 2d shows a diagram describing a method by which two mobile stations in the same mobile network negotiate a bearer service.

It may also be possible that the other party of the service execution is not an element in the network but another mobile terminal MT2. This situation may arise, for example, if a user wants to start a video call, or the like, at his mobile terminal with another user's mobile terminal MT2. FIG. 2d describes a method for negotiating a bearer service between two mobile terminals MT1, MT2, which are communicating within the same mobile network NW1. In this kind of mobile-to-mobile case, the mobile terminal MT1 that initiated the call has probably already performed the bearer service negotiation process for the bearer service used during the service session before the actual connection to the called mobile terminal MT2 (blocks 224, 225, 226, 227). When the bearer service is accepted by the application in the mobile terminal MT1 that initiated the call, it sends to the mobile network NW1 a request to form a connection to the called mobile terminal MT2 (block 228). That request is forwarded through the network to the called mobile terminal MT2 (block 229). Then, the execution environment (or some other system module, for example in lower level call handling software) in the called mobile terminal MT2 checks if the called mobile terminal MT2 is able to use the bearer, which the calling mobile terminal MT1 suggests (block 230).

The called mobile terminal MT2 performs a bearer service request procedure with the mobile network NW1 and sends a bearer service request network message to the mobile network NW1 (block 231). That WMSC 4 which receives the bearer service request network message, examines the content of the message. Advantageously the subscription information of the called user is also examined (block 232). The user's subscription information may have some restrictions that may affect the selection of the bearer service. There may be e.g. different kinds of mobile subscriptions with different pricing policies. Therefore it is possible that the bearer service request is denied completely, or the allowable bearer services for the particular user of the called mobile terminal MT2 may limit the selection of the bearer service. The result of examination of the called user's subscription information is sent back to the WMSC 4 of the mobile network NW1.

Based on the reply from the mobile network NW1, the WMSC 4 denies the bearer request or continues the bearer service selection process. In the latter case, or in such a case that the subscription information of the user of the called mobile terminal MT2 does not affect the selection, the other grounds for the bearer service requested are examined in the mobile network NW1, advantageously taking into account the traffic situation of the serving mobile network. In this phase the properties of the mobile network NW1 are compared with the parameters in the request and a suitable bearer service is suggested. The bearer selection may also be affected by the traffic situation of the mobile network NW1. If the mobile network NW1 cannot support the requested bearer service at the time, the request may be denied or another bearer service than requested is suggested.

On the basis of the result of the bearer selection process the mobile network NW1 forms a bearer service reply network message, and sends it to the called mobile terminal MT2 (block 233). The called mobile terminal MT2 replies to the connection request network message by sending a connection response network message to the mobile network NW1 (block 234).

This connection response network message is forwarded to the mobile terminal MT1 that initiated the call (block 235). If both mobile terminals MT1, MT2 accepted the proposed bearer service (or services), the connection is established between the mobile terminals MT1, MT2 (block 239).

If, however, neither mobile terminal MT1 nor MT2 accepted the proposed bearer service(s) (block 236), the bearer selection procedure loops back to beginning (block 224). The mobile terminal MT1 that initiated the call selects new parameters and performs a new bearer service request with new parameters.

If the called mobile terminal MT2 did not accept the proposed bearer service(s), it may have suggested another bearer service (block 237), wherein the mobile terminal MT1 checks if it can accept the suggested bearer service. If the mobile terminal MT1 accepts the alternative bearer service suggested by the called mobile terminal MT2, the bearer selection procedure loops back to block 225. If the called mobile terminal MT2 did not accept the proposed bearer service(s) and did not suggest another bearer service (block 238), the mobile terminal MT1 either selects and proposes another bearer service, wherein the bearer selection procedure loops back to block 224, or otherwise the connection procedure fails.

The request network messages between the mobile terminal MT1, MT2 and the network NW1 are advantageously sent using a default connection-initiating bearer.

It is also possible that the called mobile terminal MT2 is communicating with another mobile network than the calling mobile terminal MT1. In such a situation the process is slightly different from the situation where the calling mobile terminal MT1 and the called mobile terminal MT2 are communicating in the same mobile network. It is apparent to a person skilled in the art that the above mentioned phases which are carried out in one mobile network NW1, can be implemented in several networks NW1, NW2.

This scheme also applies in the situation where the mobile terminal first, before performing the bearer service request to the serving network, negotiates the preferred bearer service parameters with the service party, which may be a network element, e.g. a service provider's server, in a remote (e.g. IP) network.

In some cases it may not be sufficient that the serving network only checks its own capabilities and traffic situations relating to bearer service request. If the mobile terminal is trying to initiate a service, which also needs connection to a network other than the serving network, the serving network may also check the situation and capabilities of the other network. This is achieved advantageously by a standard signalling interface (not shown) between different networks to provide requests/responses about their capabilities and traffic situations. If such an interface is available, the serving network communicates with the other networks, which are needed in the service execution, and after getting responses from those networks, suggests a bearer service suitable for all the parties involved. For example, the WMSC 4 in the serving network and the WMSC in the other network may communicate with each other like e.g. in normal roaming situation.

The invention is not limited solely to the embodiments presented above, but it can be modified within the scope of the appended claims.

The invention claimed is:

1. A method comprising:
providing an application execution environment configured to operate in a mobile terminal and to support execution of a plurality of applications in the mobile terminal; and
providing a programming interface configured to allow one of the plurality of applications to select, based on one or more specified requirements, one of a plurality of bearer services for communication between the mobile terminal and a mobile communication system;
wherein the application execution environment is configured to, in response to receipt of a request from one of the plurality of applications through the programming interface, negotiate with the mobile communication system to establish communication using the one selected bearer service.

2. The method of claim 1, wherein the application execution environment is configured to, in response to receipt of a request comprising a communication data rate, negotiate with the mobile communication system to communicate using a bearer service supporting the communication data rate.

3. The method of claim 1, wherein the application execution environment is configured to, in response to receipt of a request comprising a quality of service requirement, negotiate with the mobile communication system to communicate using a bearer service supporting the quality of service requirement.

4. The method of claim 1, wherein the application execution environment is configured to, in response to receipt of a request comprising a traffic class, negotiate with the mobile communication system to communicate using a bearer service corresponding to the traffic class.

5. The method of claim 1, wherein the application execution environment is configured to, in response to receiving from the mobile communication system a plurality of different bearer services available in the mobile communication system, generate a reply to the one application including the plurality of different bearer services available.

6. The method of claim 1, wherein the application execution environment is configured to, in response to receiving from the mobile communication system a plurality of different bearer services available in the mobile communication system, generate a display on the mobile terminal of the plurality of different bearer services and to receive selection from a user of the mobile terminal of one of the plurality displayed.

7. The method of claim 1, wherein the application execution environment is configured to provide an indication to the one application that a change in the selected bearer service has occurred.

8. The method of claim 1, wherein the application execution environment is configured to obtain information about a property of the mobile terminal.

9. The method of claim 8, wherein the property comprises display characteristics of the mobile terminal.

10. The method of claim 1, wherein the application execution environment is configured to receive from the one application a plurality of requirements for communicating using a bearer service and to negotiate with the mobile communication system to establish communication using a bearer service that meets the plurality of requirements.

11. The method of claim 1, wherein the application execution environment is configured to retrieve a capability of the mobile terminal and, in response to receiving a request from the one application for a bearer service and determining that the requested bearer service would not efficiently be used in view of the capability of the mobile terminal, selecting a different bearer service than the one requested from the one application.

12. The method of claim 1, wherein the application execution environment is configured to retrieve a user subscription parameter from the mobile communication system and to use the user subscription parameter in selecting a bearer service.

13. An apparatus comprising:
a processor and associated memory collectively configured to perform:
providing an application execution environment configured to operate in a mobile terminal and to support execution of a plurality of applications in a mobile terminal; and
providing a programming interface configured to allow one of the plurality of applications to select, based on one or more specified requirements, one of a plurality of bearer services for communication between the mobile terminal and a mobile communication system;
wherein the application execution environment is configured to, in response to receipt of a request from one of the plurality of applications through the programming interface, negotiate with the mobile communication system to establish communication using the one selected bearer service.

14. The apparatus of claim 13, wherein the application execution environment is configured to, in response to receipt of a request comprising a communication data rate, negotiate with the mobile communication system to communicate using a bearer service supporting the communication data rate.

15. The apparatus of claim 13, wherein the application execution environment is configured to, in response to receipt of a request comprising a quality of service requirement, negotiate with the mobile communication system to communicate using a bearer service supporting the quality of service requirement.

16. The apparatus of claim 13, wherein the application execution environment is configured to, in response to receipt of a request comprising a traffic class, negotiate with the mobile communication system to communicate using a bearer service corresponding to the traffic class.

17. The apparatus of claim 13, wherein the application execution environment is configured to, in response to receiving from the mobile communication system a plurality of different bearer services available in the mobile communication system, generate a reply to the one application including the plurality of different bearer services available.

18. The apparatus of claim 13, wherein the application execution environment is configured to, in response to receiving from the mobile communication system a plurality of different bearer services available in the mobile communication system, generate a display on the mobile terminal of the plurality of different bearer services and to receive selection from a user of the mobile terminal of one of the plurality displayed.

19. The apparatus of claim 13, wherein the application execution environment is configured to provide an indication to the one application that a change in the selected bearer service has occurred.

20. The apparatus of claim 13, wherein the application execution environment is configured to obtain information about a property of the mobile terminal.

21. The apparatus of claim 20, wherein the property comprises display characteristics of the mobile terminal.

22. The apparatus of claim 13, wherein the application execution environment is configured to receive from the one application a plurality of requirements for communicating using a bearer service and to negotiate with the mobile communication system to establish communication using a bearer service that meets the plurality of requirements.

23. The apparatus of claim 13, wherein the application execution environment is configured to retrieve a capability of the mobile terminal and, in response to receiving a request from the one application for a bearer service and determining that the requested bearer service would not efficiently be used in view of the capability of the mobile terminal, selecting a different bearer service than the one requested from the one application.

24. The apparatus of claim 13, wherein the application execution environment is configured to retrieve a user subscription parameter from the mobile communication system and to use the user subscription parameter in selecting a bearer service.

25. A memory having stored therein program instructions that, when executed by a processor in a mobile terminal, perform:
providing an application execution environment configured to operate in a mobile terminal and configured to support execution of a plurality of applications in the mobile terminal; and providing a programming interface configured to allow one of the plurality of applications to select, based on one or more specified requirements, one of a plurality of bearer services for communication between the mobile terminal and a mobile communication system;

wherein the application execution environment is configured to, in response to receipt of a request from one of the plurality of applications through the programming interface, negotiate with the mobile communication system to establish communication using the one selected bearer service.

26. The memory of claim 25, wherein the application execution environment is configured to, in response to receipt of a request comprising a communication data rate, negotiate with the mobile communication system to communicate using a bearer service supporting the communication data rate.

27. The memory of claim 25, wherein the application execution environment is configured to, in response to receipt of a request comprising a quality of service requirement, negotiate with the mobile communication system to communicate using a bearer service supporting the quality of service requirement.

28. The memory of claim 25, wherein the application execution environment is configured to, in response to receipt of a request comprising a traffic class, negotiate with the mobile communication system to communicate using a bearer service corresponding to the traffic class.

29. The memory of claim 25, wherein the application execution environment is configured to, in response to receiving from the mobile communication system a plurality of different bearer services available in the mobile communication system, generate a reply to the one application including the plurality of different bearer services available.

30. The memory of claim 25, wherein the application execution environment is configured to, in response to receiving from the mobile communication system a plurality of different bearer services available in the mobile communication system, generate a display on the mobile terminal of the plurality of different bearer services and to receive selection from a user of the mobile terminal of one of the plurality displayed.

31. The memory of claim 25, wherein the application execution environment is configured to provide an indication to the one application that a change in the selected bearer service has occurred.

32. The memory of claim 25, wherein the application execution environment is configured to obtain information about a property of the mobile terminal.

33. The memory of claim 32, wherein the property comprises display characteristics of the mobile terminal.

34. The memory of claim 25, wherein the application execution environment is configured to receive from the one application a plurality of requirements for communicating using a bearer service and to negotiate with the mobile communication system to establish communication using a bearer service that meets the plurality of requirements.

35. The memory of claim 25, wherein the application execution environment is configured to retrieve a capability of the mobile terminal and, in response to receiving a request from the one application for a bearer service and determining that the requested bearer service would not efficiently be used in view of the capability of the mobile terminal, selecting a different bearer service than the one requested from the one application.

36. The memory of claim 25, wherein the application execution environment is configured to retrieve a user subscription parameter from the mobile communication system and to use the user subscription parameter in selecting a bearer service.

* * * * *